(12) United States Patent
Khalid et al.

(10) Patent No.: US 12,549,253 B2
(45) Date of Patent: Feb. 10, 2026

(54) SECTORIZATIION TECHNIQUE FOR HIGH-SPEED OPTICAL WIRELESS COMMUNICATION

(71) Applicant: SIGNIFY HOLDING B.V., Eindhoven (NL)

(72) Inventors: Amir Masood Khalid, Eindhoven (NL); Paul Henricus Johannes Maria Van Voorthuisen, Sint Oedenrode (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 272 days.

(21) Appl. No.: 18/561,005

(22) PCT Filed: May 16, 2022

(86) PCT No.: PCT/EP2022/063155
§ 371 (c)(1),
(2) Date: Nov. 15, 2023

(87) PCT Pub. No.: WO2022/243229
PCT Pub. Date: Nov. 24, 2022

(65) Prior Publication Data
US 2024/0259097 A1    Aug. 1, 2024

(30) Foreign Application Priority Data

May 21, 2021    (EP) ...................................... 21175291

(51) Int. Cl.
*H04B 10/112*    (2013.01)
(52) U.S. Cl.
CPC ................................. *H04B 10/1123* (2013.01)
(58) Field of Classification Search
CPC ............................................ H04B 10/11–118
See application file for complete search history.

(56) References Cited

U.S. PATENT DOCUMENTS

| 6,606,175 B1 | 8/2003 | Sampsell et al. |
| 9,473,229 B2 | 10/2016 | Yin et al. |

(Continued)

FOREIGN PATENT DOCUMENTS

CN    107026683 B    8/2020

OTHER PUBLICATIONS

Shen, Thomas C., et al., Design of Dual-Link (Wide- and Narrow-Beam) LED Communication Systems, Optical Society of America, Optics Express, 2014 (12 Pages).

*Primary Examiner* — Nathan M Cors

(57) ABSTRACT

An apparatus (100) for use in an optical wireless communication system comprises: a wide beam light source (L5): two or more narrow beam light sources (L1-L4) configured to emit in a different direction, wherein a combined field-of-view. FoV, of the narrow beam light sources (L1-L4) is covered by a FoV of the wide beam light source (L5); a plurality of switches (S1-S5) configured to turn on or off a corresponding one out of the 5 light sources (L1-L5) individually; a receiver (RX) configured to receive one or more feedback signals from a remote device (200); and a controller (CTR) configured to control the plurality of switches (S1-S5) via a control signal; update the control signal based on the one or more feedback signals received by the receiver (RX): carry out a beam selection procedure by sending test signals via the wide beam light source (L5) and one or more 10 narrow beam light sources (L1-L4) to the remote device (200) to enable a selection of one out of the narrow beam light sources (L1-L4) for establishing data communication with the remote device (200).

14 Claims, 5 Drawing Sheets

(56) References Cited

U.S. PATENT DOCUMENTS

| | | | |
|---|---|---|---|
| 10,050,343 B2 | 8/2018 | Clevorn et al. | |
| 2002/0131121 A1* | 9/2002 | Jeganathan | H04B 10/1127 |
| | | | 398/118 |
| 2004/0258415 A1* | 12/2004 | Boone | H04B 10/1125 |
| | | | 398/125 |
| 2011/0274434 A1* | 11/2011 | Cunningham | H04B 10/112 |
| | | | 398/118 |
| 2015/0349881 A1* | 12/2015 | Byers | H04B 10/11 |
| | | | 398/118 |
| 2019/0082520 A1* | 3/2019 | Noshad | H05B 47/19 |
| 2024/0430008 A1* | 12/2024 | Wendt | H04B 10/40 |

* cited by examiner

SECTORIZATION TECHNIQUE FOR HIGH-SPEED OPTICAL WIRELESS COMMUNICATION

CROSS-REFERENCE TO PRIOR APPLICATIONS

This application is the U.S. National Phase application under 35 U.S.C. § 371 of International Application No. PCT/EP2022/063155, filed on May 16, 2022, which claims the benefit of European patent application Ser. No. 21/175, 291.0, filed on May 21, 2021. These applications are hereby incorporated by reference herein.

FIELD OF THE INVENTION

The invention relates to the field of optical wireless communication networks, such as Li-Fi networks. More particularly, various methods, apparatus, systems, and computer-readable media are disclosed herein related to a sectorized transmitter to support high speed optical wireless communication.

BACKGROUND OF THE INVENTION

To enable more and more electronic devices like laptops, tablets, and smartphones to connect wirelessly to the Internet, wireless communication confronts unprecedented requirements on data rates and link qualities, and such requirements keep on growing year over year, considering the emerging digital revolution related to Internet-of-Things (IoT). Radio frequency technology like Wi-Fi has limited spectrum capacity to embrace this revolution. In the meanwhile, light fidelity (Li-Fi) is drawing more and more attention with its intrinsic security enhancement and capability to support higher data rates over the available bandwidth in visible light, Ultraviolet (UV), and Infrared (IR) spectra. Furthermore, Li-Fi is directional and shielded by light blocking materials, which provides it with the potential to deploy a larger number of access points, as compared to Wi-Fi, in a dense area of users by spatially reusing the same bandwidth. These key advantages over wireless radio frequency communication make Li-Fi a promising secure solution to mitigate the pressure on the crowded radio spectrum for IoT applications and indoor wireless access. Other possible benefits of Li-Fi may include guaranteed bandwidth for a certain user, and the ability to function safely in areas otherwise susceptible to electromagnetic interference. Therefore, Li-Fi is a very promising technology to enable the next generation of immersive connectivity.

There are several related terminologies in the area of lighting-based communication. Visible-light communication (VLC) transmits data by intensity modulating optical sources, such as light emitting diodes (LEDs) and laser diodes (LDs), faster than the persistence of the human eye. VLC is often used to embed a signal in the light emitted by an illumination source such as an everyday luminaire, e.g., room lighting or outdoor lighting, thus allowing use of the illumination from the luminaires as a carrier of information. The light may thus comprise both a visible illumination contribution for illuminating a target environment such as a room (typically the primary purpose of the light), and an embedded signal for providing information into the environment (typically considered a secondary function of the light). In such cases, the modulation may typically be performed at a high enough frequency to be beyond human perception, or at least such that any visible temporal light artefacts (e.g., flicker and/or strobe artefacts) are weak enough and at sufficiently high frequencies not to be noticeable or at least to be tolerable to humans. Thus, the embedded signal does not affect the primary illumination function, i.e., so the user only perceives the overall illumination and not the effect of the data being modulated into that illumination.

For wireless optical communication at high speed, often Infrared (IR) rather than visible light communication is used. Although the ultraviolet and infrared radiation is not visible to the human eye, the technology for utilizing these regions of the spectra is the same, while variations may occur as a result of wavelength dependencies, such as in the case of refractive indices. In many instances there are advantages to using ultraviolet and/or infrared as these frequency ranges are not visible to the human eye, and more flexibility can be introduced in the system. Of course, ultraviolet quanta have higher energy levels compared to those of infrared and/or visible light, which in turn may render use of ultraviolet light undesirable in certain circumstances.

To provide a relatively large coverage (such as with a beam angle of 30-60 degrees) is a critical aspect on determining the performance of optical wireless communication. However, the coverage requirement may result in significant reduction in received optical power at a remote device side, due to a high path loss, the constraint on output power (such as for eye-safety purpose), and power consumption limitation (especially for a mobile device). Thus, the throughput to be achieved on a wide-angle link is also reduced accordingly. One way to overcome the problem is to make use of a sectorized transmitter, which has more than one light source directed to different orientations. And then, selecting a single light source that leads to a best alignment to a certain remote device, and using that single light source for data communication, which provides a good balance 30) between coverage and power consumption. However, to enable the selection of a most suitable transmitting sector, the sectorized transmitter typically also requires a sectorized light sensor, such as multiple photodiodes (PDs). An individual PD is used to receive a feedback from the remote device related to a corresponding light source belonging to the same sector. The draw back of this solution is that it may increase the size and the cost of the device.

US2019082520A1 relates to optical wireless communication devices that comprise a plurality of narrow beam width light emitting diodes to provide a wide-angle transmitter. The transmitter can be used in optical wireless communication systems, and designed to select one of the light emitting diodes that points towards the receiver for more reliable information exchange or data transmission.

U.S. Pat. No. 9,473,229B2 relates to a receiver in a communication system that includes a synchronization module and a channel estimator. The synchronization module is configured to identify an end of a cyclic prefix in a received signal using slope detection by monitoring a detection metric threshold in the received signal. The channel estimator is configured to estimate a complex noise variance using guard band subcarriers.

SUMMARY OF THE INVENTION

In order to overcome the draw back with a conventional sectorized transmitter, the inventors propose a different solution by applying the sectorization technique only to a transmitting front end but not to a receiving front end, such that the disclosed transmitter comprises more than one light source but at most one light sensor. In order to coordinate a feedback-based beam selection procedure, a wide beam light source is adopted to enable a signaling link between the transmitter and a remote device. During the beam selection procedure, the connection related to an individual segmented light source and the remote device is tested. And then, a light source contributing to a best alignment towards the remote device is selected for establishing data communication. In this manner, the sectorized transmitter may be achieved at a modest cost and relatively small form factor.

In view of the above, the present disclosure is directed to methods, apparatus, and systems for providing a sectorized apparatus to achieve high speed optical communication with a low cost and a low power consumption. More particularly, the goal of this invention is achieved by an apparatus as claimed in claim 1, by an OWC system as claimed in claims 11 and 12, by a method of an apparatus as claimed in claim 13, and by a computer program as claimed in claim 14.

In accordance with a first aspect of the invention an apparatus is provided. An apparatus for use in an optical wireless communication, OWC, system, the apparatus comprises: a wide beam light source: two or more narrow beam light sources each configured to emit in a different direction, wherein a combined field-of-view, FoV, of the narrow beam light sources is covered by a FoV of the wide beam light source: a plurality of switches each configured to turn on or off a corresponding one out of the wide beam light source and the two or more narrow beam light sources individually: a receiver configured to receive one or more feedback signals from a remote device; and a controller configured to: control the plurality of switches via a control signal: update the control signal based on the one or more feedback signals received by the receiver: carry out a beam selection procedure by sending test signals via the wide beam light source and one or more narrow beam light sources to the remote device to enable selection of one out of the narrow beam light sources for establishing data communication with the remote device.

To carry out a sectorization technique in an optical wireless communication system, a conventional approach is to deploy in a single device multiple narrow beam sectorized light sources and multiple narrow FoV light sensors correspondingly. Different from the conventional approach, the apparatus as disclosed in the present invention does not comprise the multiple narrow FoV light sensors, but instead it comprises a wide beam light source in addition to the multiple narrow beam sectorized light sources. The wide beam light source is configured to establish a signaling link between the apparatus and a remote device to carry out the beam selection procedure, by keeping the FoV of the wide beam light source covering the combined FoVs of the multiple narrow beam sectorized light sources. The beam selection procedure may be carried out each time before establishing a new OWC link with a new remote device. The beam selection procedure may also be triggered when a current data link degrades due to a movement of the apparatus or the remote device or another change on the channel between the selected light source and the remote device. And then, another segment may be selected to adapt to the change.

The FoVs of the multiple narrow beam sectorized light sources are directed to different orientations according to a sectorized deployment. It may also be an option that there is an overlap between adjacent sectors to provide better coverage. However, it is preferable that the overlap is relatively small to enhance the energy efficiency of the apparatus. The FoV of the wide beam light source is equal to or larger than the combined FoVs of the narrow beam light sources. Preferably, the wide beam light source is also configured to provide a low-speed wide coverage data transmission with the remote device, which may be used as a backup solution when none of the narrow beam light sources is aligned with the remote device.

The testing signals sent by the wide beam light source and one or more narrow beam light sources are measured at the remote device side to assess different sectors individually. Feedback signals from the remote device are used to assist the apparatus to determine the optimal sector for establishing data communication. Since the information is carried in the content of the feedback signals instead of the impinging angles of the feedback signals, the feedback signals may be sent via different modalities.

In one setup, the receiver is an OWC receiver, and the OWC receiver is further configured to receive data packets from the remote device for data communication.

According to this setup, the feedback signals are sent via an OWC link. Beneficially, the OWC receiver is used for both receiving feedback signals during the beam selection procedure and also for data communication after a certain light source is selected. And then, a bidirectional OWC link may be enabled by the apparatus and the remote device.

Preferably, the OWC receiver is a wide beam receiver with a single photodiode. Thus, the apparatus is an OWC transceiver with the sectorization technique applied to the transmitting means only via the two or more narrow beam light sources.

In another setup, the receiver is a radio receiver, and the one or more feedback signals are received by the radio receiver via a radio frequency channel.

The feedback signals from the remote device may also be sent via another wireless link, such as a radio frequency channel, rather than an OWC link. The other wireless link may be according to a short-range wireless communication protocol, such as Wi-Fi, Zigbee, or BLE. Considering the propagation pattern of such RF signals, the coverage area of the radio receiver is typically sufficient to receive the feedback signals from the remote device reliably.

Advantageously, each narrow beam light source supports a larger signal bandwidth than the wide beam light source.

With a larger bandwidth of the narrow beam light source, a higher data rate can be supported. The narrow beam light source offers higher performance than the wide beam light source. Usually, the narrow beam light source may consume more power. However, to transmit the same amount of data, the narrow beam light source needs less time as compared to the wide beam light source on account of the higher throughput speed, the energy consumed to send a certain amount of data may be comparable or even less for a narrow beam light source. Furthermore, by supporting a higher data rate, more applications can be supported by the narrow beam light source, such as a high-resolution video streaming. In the meantime, the signaling link used for the beam selection procedure does not require a high data rate given the limited information to be sent, and thus, it is preferable to have the wide beam light source support low to medium data rate communication, to reduce the power consumption during the beam selection procedure.

Thus, by deploying multiple narrow beam light source directed to different sectors in the apparatus, it is possible to achieve optical data transmission with both high speed and large coverage with a reduced power consumption, because only a single narrow beam light source is selected for data transmission.

Preferably, during the beam selection procedure the controller is configured to set the control signal to: turn on the wide beam light source; and simultaneously, turn on at most one of the narrow beam light sources; and wherein the wide beam light source and the receiver are configured to maintain a low speed bi-directional signaling link with the remote device to assist the beam selection procedure.

During the beam selection procedure, the two or more narrow beam light sources are turned on individually to evaluate the performance related to each individual sector or segment for data communication. The wide beam light source and the receiver are used to enable the apparatus to establish a bi-directional signaling link with the remote device to coordinate the beam selection procedure. The information exchanged on the signaling link may comprise an indicator of a start and/or an end of the beam selection procedure and one or more feedback signals.

Since the test signals and feedback signals are typically short packets, sending and receiving them may consume limited time and power, and more importantly, the more power consuming narrow beam light sources are only turned on occasionally. The power requirements of the beam selection procedure may thus be lowered.

Beneficially, the one or more feedback signals are related to a signal quality of a test signal received by the remote device, and the signal quality is related to at least one of: a received signal strength, a signal to noise ratio, a power spectrum density, and a bit error rate.

In order to evaluate each individual segmented narrow beam light source, a corresponding feedback signal is provided by the remote device, which is related to a signal quality of a received test signal from an individual narrow beam light source. Different parameters may be used to represent the signal quality of a received test signal, such as a received signal strength indicator (RSSI), a signal to noise ratio (SNR), a power spectrum density (PSD), and a bit error rate (BER).

In one example, the controller is configured to set the control signal to turn on each one out of the narrow beam light sources sequentially during the beam selection procedure.

Depending on the configuration of the beam selection procedure, an exhaustive search may be carried out by turning on each one out of the narrow beam light sources sequentially during the beam selection procedure.

Advantageously, the controller is configured to select one narrow beam light source based on a comparison of signal qualities comprised in feedback signals received sequentially corresponding to a time period that an individual narrow beam light source is on.

To simplify the signaling exchange, no identifier or sequence number may be comprised in the test signals and/or the feedback signals. Instead, the narrow beam light sources may be controlled to turning on sequentially according to a certain time sequence. Correspondingly, a feedback signal received during a certain time period or time window is also related to a currently emitting light source. In this way, the apparatus may collect the link qualities related to different sector one after another. By looping through all the sectors, the one contributing to a best link quality at the remote device side may be selected for establishing data communication.

In another example, the controller is configured to select one narrow beam light source when a signal quality comprised in a feedback signal is larger than a predefined threshold, and the feedback signal is received in a time period that the corresponding narrow beam light source is on.

Instead of looping through all the sectors, it may also be an option that whenever a sector satisfies a certain link quality requirement, the beam selection procedure may stop earlier as compared to the previous example. This option may reduce the latency of the beam selection procedure, which can be quite beneficial when the amount of data to be sent by the apparatus is not significant. In that sense, not an optimal sector is selected, but a one that is good enough. Optionally in this case, the search may start at the last narrow beam light source used and/or the narrow beam light sources adjacent thereto and continue therefrom with their respective neighbors not yet tested.

Beneficially, the controller is configured to control the plurality of switches to turn on only a selected narrow beam light source for data communication and turn off all the other light sources after the beam selection procedure.

When a narrow beam light source is selected during the beam selection procedure, only that narrow beam light source will be active during data communication. Alternatively, if no narrow beam light source satisfies a certain requirement or performs better than the wide beam light source, it may also be an option to use the wide beam light source for data communication. And then, all the narrow beam light sources may be turned off with only the wide beam light source on after the beam selection procedure.

Advantageously, each one of the wide beam light source and the two or more narrow beam light sources comprises at least one of: a light emitting diode (LED), a laser, and a vertical-cavity surface-emitting laser (VCSEL).

There are different types of light sources, such as a LED, a laser, a VCSEL, a VCSEL array, a laser diode, or an LEP (light-emitting plasma), the difference among which may lie in power consumption, coverage, maximum output power, response time or signal bandwidth. A LED based optical wireless communication system is typically characterized by a relatively long communication distance and large FoV/coverage area, but low to mediate data rates, while a VCSEL based optical wireless communication system is typically characterized by high data rates, but a relatively small angular coverage with a narrow FoV.

The wide beam light source and the narrow beam light sources may be of different types. As one example, the wide beam light source may be a LED and a narrow beam light source may be a VCSEL. The wide beam light source and the narrow beam light sources may also be of the same type but with a difference on the beam angles. Similarly, the two or more narrow beam light sources may be of the same type or different types.

In accordance with a second aspect of the invention a system is provided, where the optical wireless communication, OWC, system comprises: an apparatus according to the present invention; and a remote OWC transceiver comprises at least one light sensor configured to receive at least one of the test signals sent by the apparatus: at least one light source configured to send one or more feedback signals to the apparatus upon receipt of at least one of the test signals from the apparatus by the at least one light sensor.

According to another setup, the OWC system comprises an apparatus according to the present invention; and a remote OWC receiver comprises at least one light sensor configured to receive at least one of the test signals sent by the apparatus: at least one radio transmitter configured to send one or more feedback signals via a radio frequency channel to the apparatus upon receipt of at least one of the test signals from the apparatus by the at least one light sensor.

In accordance with a third aspect of the invention a method is provided. A method of an apparatus for use in an optical wireless communication, OWC, system, the method comprises the apparatus: turning, by a plurality of switches, on or off a corresponding one out of a wide beam light source and two or more narrow beam light sources individually: emitting by each of the two or more narrow beam light sources in a different direction, wherein a combined field-of-view, FoV, of the narrow beam light sources is covered by a FoV of the wide beam light source: receiving one or more feedback signals from a remote device: controlling the plurality of switches via a control signal: updating the control signal based on the one or more feedback signals received by the receiver: carrying out a beam selection procedure by sending test signals via the wide beam light source and one or more narrow beam light sources to the remote device for selecting one out of the narrow beam light sources to establish data communication with the remote device.

The invention may further be embodied in a computing program comprising code means which, when the program is executed by an apparatus comprising processing means, cause the processing means to perform the method of the apparatus as disclosed in the present invention.

BRIEF DESCRIPTION OF THE DRAWINGS

In the drawings, like reference characters generally refer to the same parts throughout the different figures. Also, the drawings are not necessarily to scale, emphasis instead generally being placed upon illustrating the principles of the invention.

DETAILED DESCRIPTION OF EMBODIMENTS

The embodiments set forth below represent information to enable those skilled in the art to practice the embodiments and illustrate the best mode of practicing the embodiments. Upon reading the following description in light of the accompanying drawings, those skilled in the art will understand the concepts of the disclosure and will recognize applications of these concepts not particularly addressed herein. It should be understood that these concepts and applications fall within the scope of the disclosure.

To allow users to have seamless mobility without losing a connection, it is desirable that an optical communication cell to have a relatively large coverage. Since the access points (APs) are usually installed on the ceiling, they may adopt multiple high-power light sources for transmitting with wide angular divergence by leveraging mains power available on the ceiling. However, for a mobile end device or a dongle device (e.g., Li-Fi access key (LAK)), the available power budget for transmitting is quite limited, considering a USB powered interface (for USB-LAK) or direct powering from the mobile device (for an integrated OWC means).

One way to optimize the tradeoff between power consumption and coverage is to make use of the sectorization technique. It has been proposed to realize a sectorized OWC communication by employing multiple light sources, multiple Photodiode (PD) or a multi-sector PD, multiple TIAs, multiple RMS detectors. The level detection from each PD or each PD sector triggers one of the light sources that corresponds to a same sector. However, such a solution is costly and bulky in size.

The inventors propose a low cost and simple solution to achieve sectorization in an apparatus for OWC communication. The sectorization is applied only to a transmitting front end of the apparatus, instead of to both transmitting and receiving front ends as in a conventional solution. In order to select a proper sector, a feedback loop from a remote device is enabled by employing a receiver, which may be implemented in different modalities. The disclosed method may be preferably applied in, but not limited to, an end device (e.g., a USB LAK or a mobile device with an integrated OWC communication means) for use in medium to wide coverage (e.g., at least 30 degrees beam angle) and high speed (e.g., at least 100 Mbps data rate) OWC systems.

Figure 1:
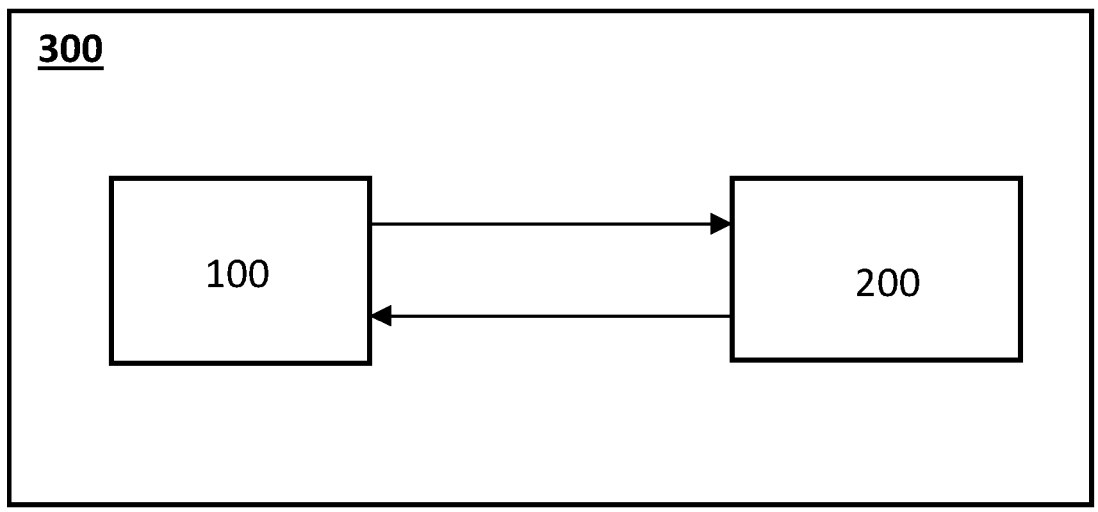
FIG. 1 illustrates a basic setup of an optical wireless communication system.

A basic setup of an optical wireless communication (OWC) system is shown in FIG. 1, which comprises an apparatus 100 and a remote device 200. The apparatus 100 has a sectorized transmitter, which comprises multiple light sources directing to different sectors. The remote device 200 is configured to assist the apparatus 100 for selecting a proper light source to establish a high-speed transmitting link from the apparatus 100 to the remote device 200.

Figure 2:
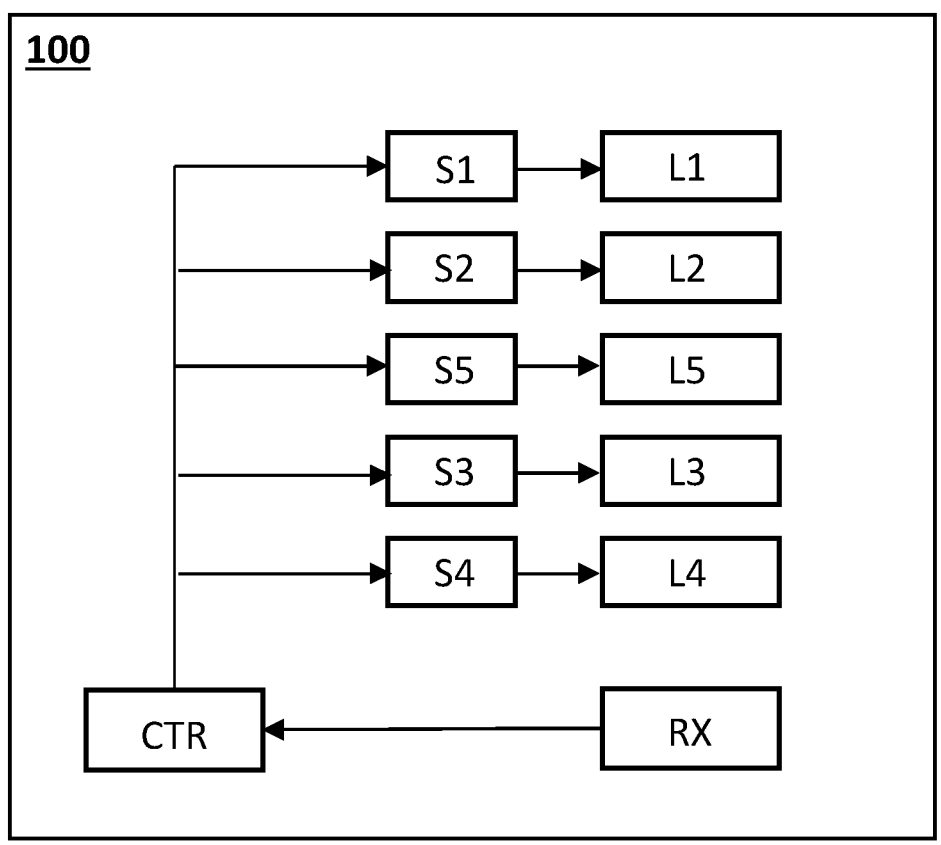
FIG. 2 illustrates a basic block diagram of the apparatus.

FIG. 2 illustrates a basic block diagram of the apparatus 100. The apparatus 100 comprises a wide beam light source L5 and two or more narrow beam light sources L1-L4. Each narrow beam light source is configured to emit in a different direction as a sectorized transmitter. A combined field-of-view, FoV, of the narrow beam light sources L1-L4 is covered by a FoV of the wide beam light source L5.

Beam angle or FoV here is understood to be the solid angle originating from the light source in three-dimensional space, where light from the light source may be perceived. The shape of the solid angle may be shaped using further optical means, such as but not limited to lenses, gratings, diaphragms and/or collimators. Another term used in conjunction with the light source is coverage area, coverage area is understood as the area in the three-dimensional space that light from the light-source impinges on.

The apparatus 100 further comprises a plurality of switches S1-S5 and a controller CTR. Each switch is configured to turn on or off a corresponding light source individually. The controller CTR is configured to provide a control signal to the plurality of switches S1-S5. The control signal may be either a multi-bit control signal or multiple single-bit control signals.

The apparatus further comprises a receiver RX. The RX is configured to receive one or more feedback signals from a remote device 200. The controller CTR is further configured to derive the control signal based on the one or more feedback signals received by the receiver and to carry out a beam selection procedure by sending test signals via the wide beam light source L5 and one or more narrow beam light sources L1-L4 to the remote device 200 for selecting one out of the narrow beam light sources L1-L4 to establish data communication with the remote device 200.

Preferably, a narrow beam light source comprises at least one of a LED, a laser, and a vertical-cavity surface-emitting laser (VCSEL). The two or more narrow beam light sources L1-L4 may be of the same type or of different types, such that the two or more narrow beam light sources L1-L4 comprise different light sources. Preferably, the wide beam light source L5 comprises at least one of a LED, a laser, and a vertical-cavity surface-emitting laser (VCSEL).

Note that each narrow beam light sources L1-L4 supports a larger signal bandwidth for communication than the wide beam light source L5. Thus, by selecting a narrow beam light source for transmitting, a high-speed data link can be established. However, if the link qualities between each of the narrow beam light sources L1-L4 and the remote device 200 are not sufficient to support a high-speed link, it may also be possible that a low to medium data rate link is established via the wide beam light source L5 and the remote device 200. Typically, a high-speed link supports a data rate of at least 100 Mbps, preferably up to a few hundred Mbps, such as 300 Mbps or more.

Figure 3:
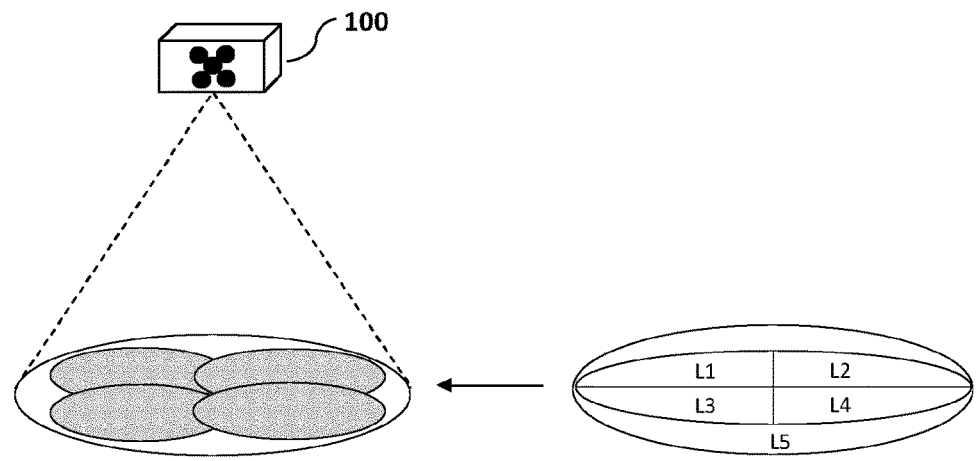
FIG. 3 demonstrates one example of transmitter sectorization.

FIG. 3 demonstrates one example of transmitter sectorization. Typically, the number of narrow beam light sources should be at least two. In this example, the apparatus comprises four narrow beam light sources L1-L4 and one wide beam light source, which are represented by five ellipses. Each of the light sources may be a LED, a laser, a laser diode, or a VCSEL. The FoVs of different light sources are illustrated in the figure, where the wide beam light source L5 has a FoV covers the combined FoVs of all the narrow beam light sources L1-L4. In this example, it assumes a uniform split of the four sectors, which should not be understood as a limitation to the scope of the invention. The FoVs of the multiple narrow beam light sources may be the same or different from each other. There may also be an overlap between the FoVs of two adjacent narrow beam light sources.

Figure 4:
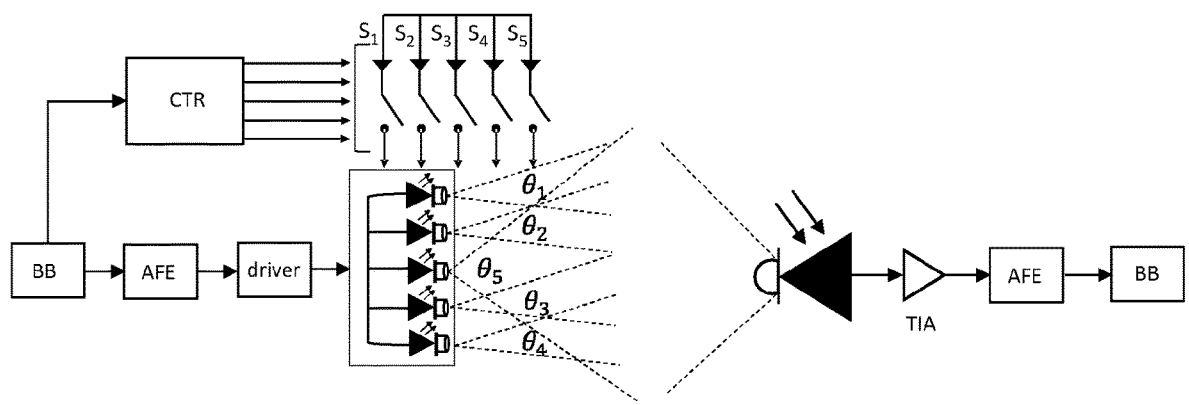
FIG. 4 illustrates one possible system architecture.

FIG. 4 illustrates one possible system architecture of a sectorized transmitter and a remote receiver. The sectorized transmitter comprises a low-cost microcontroller CTR, a plurality of switches, such as single pole single throw (SPST) SPST switches, S1 . . . S5 to control multiple light sources L1-L5. In this example, L5 has a wide beam angle or wide divergence angle $\theta_5$ and the other light sources L1-L4 have narrow beam angles or narrow divergence angles $\theta_1\sim\theta_4$, respectively. Preferably, L1-L4 are configured to have sectorized coverage profile by transmitting in narrow beam angles directed to different orientations. The divergence angle $\theta_5$ of L5 covers the combined divergence angles $\theta_1\sim\theta_4$ of L1-L4. Therefore, the total beam angle of the sectorized transmitter is defined by $\theta_5$. As an example, to achieve a total beam angle of ±50°, it may be an option to configure $\theta_5$ to be around ±50° and each one of $\theta_1\sim\theta_4$ to be around ±12.5° pointing in different directions. To provide a better coverage of narrow beam light sources, it may also be an option to have $\theta_1\sim\theta_4$ being configured to be larger than ±12.5° allowing an overlap between two adjacent sectors. Of course, it is not necessary that L1-L4 are of the same type and/or have the same beam angle. A hybrid configuration with different light sources may also be adopted for the narrow beam light sources. The disclosed method can still apply, as long as the test signals are not sent by more than one narrow beam light source simultaneously. In that sense, the feedback signal is based on a received signal quality of a test signal sent by at most a single narrow beam light source. Thus, the overlapping of FoVs among narrow beam light sources will not introduce interference to each other during the beam selection procedure.

The microcontroller CTR may control the switches S1-S5 for sending test signals via the wide beam light source L5 and the narrow beam light sources L1-L4 to a remote receiver. And then upon one or more feedbacks received from the remote device, the microcontroller CTR may select one narrow beam light source to establish a high-speed transmission link between the sectorized transmitter and the remote receiver. The one or more feedbacks are related to signal qualities of the one or more test signals received by the remote receiver. A signal quality may be represented by one of: a received signal strength, a signal to noise ratio (SNR), a power spectrum density (PSD), and a bit error rate (BER). As exemplarily illustrated in FIG. 4, the system may comprise a dedicated baseband module BB used to extract information received from the remote receiver. The dedicated baseband module BB may be used to demodulate signals for a front end used for either optical wireless communication or RF communication, or for both. It may also be possible that the microcontroller CTR is capable to demodulate the feedbacks received from the remote receiver. Then the dedicated baseband module BB is used for data communication, but not for the signaling control during the beam selection procedure. Depending on the system setup, the microcontroller CTR may be connected to the baseband module BB, as shown in FIG. 4. It may also be possible that the microcontroller CTR is connected to the analog front end AFE directly.

In one example, the receiver comprised in the apparatus is an OWC receiver, and the OWC receiver is configured not only to receive the one or more feedback signals from the remote device, but also to receive OWC data from the remote device for bi-directional data communication. Preferably, the OWC receiver is a wide FoV receiver, such that the FoV of the OWC receiver is comparable to the FoV of the wide beam light source L5 of the apparatus 100.

In another example (not shown in FIG. 4), the receiver comprised in the apparatus is a radio receiver. Thus, the feedback signals are sent by the remote device over a radio frequency channel.

Figure 5:
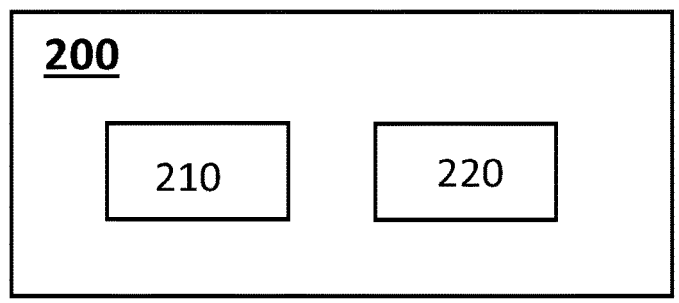
FIG. 5 illustrates a basic block diagram of the remote device.

FIG. 5 illustrates a basic block diagram of the remote device 200. As one setup, the remote device 200 is an OWC transceiver, which comprises at least one light sensor 210 and one light source 220. Correspondingly, the apparatus is also an OWC transceiver. The signaling exchange between the apparatus 100 and the remote device 200, such as sending test signals by the apparatus 100 and sending feedback signals by the remote device 200, is carried out via an OWC channel. The remote device 200 may be configured similar to the apparatus, such that it comprises more than one light source 220 and a single light sensor 210. The feedback signals are preferably be sent by the wide beam light source. It may also be possible that the remote device 200 is powered by mains power. And then the remote device may have both a sectorized OWC transmitting front end with more than one light source and a sectorized OWC receiving front end with more than one light sensor.

Figure 6:
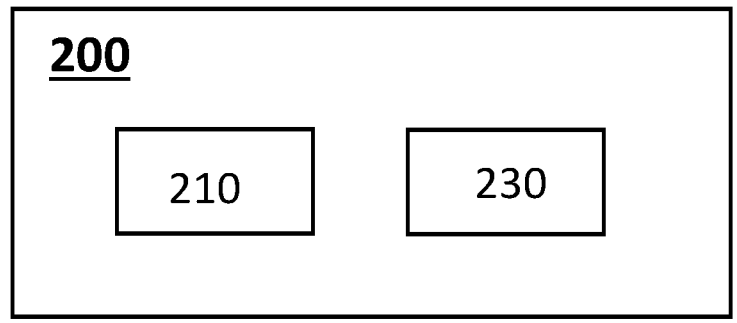
FIG. 6 illustrates a basic block diagram of the remote device.

FIG. 6 illustrates another example of the basic block diagram of the remote device 200. In this option, the remote device comprises at least one light sensor 210 for detecting the test signals sent by the apparatus 200 and a radio transmitter 230. The radio transmitter 230 is configured to send one or more feedback signals via a radio frequency channel to the apparatus 100 upon receipt of at least one of the test signals from the apparatus. The remote device 200 may be merely an OWC receiver to support a unidirectional OWC link from the apparatus 100 to the remote device 200. The remote device 200 may further comprise an OWC transmitter to carry out optical data communication, in which option a RF feedback link is used to assist the beam alignment procedure for establishing a bi-directional OWC link.

Figure 7:
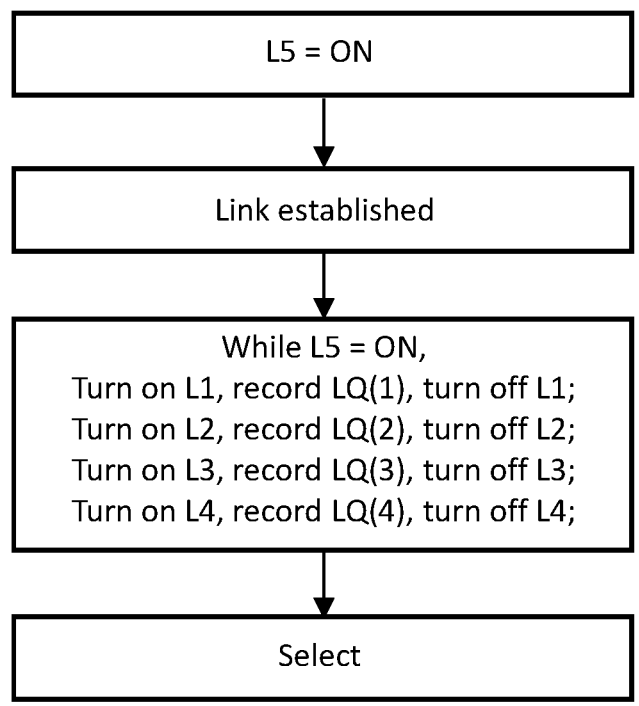
FIG. 7 shows a flow chart of an exemplary beam selection procedure.

FIG. 7 shows a flow chart of an exemplary beam selection procedure. In this option, the beam selection procedure is carried out according to an exhaustive search by testing the connections between each one out of the plurality of narrow beam light sources and the remote device. By recording the link quality of each connection, such as LQ(1)-LQ(4), the link with best quality is selected to establish the data communication. In this example, the wide beam light source L5 is used to first establish a link with the remote device. As disclosed above, since L5 supports lower data rate communication as compared to the narrow beam light source, the first link established between L5 and the remote device is used as a signaling link during the beam alignment procedure. With L5 on, each one of the narrow beam light sources L1-L4 is turned on sequentially to send a test signal to the remote device. Upon reception of a feedback signal from the remote device corresponding to a test signal sent by an individual narrow beam light source, a currently emitting narrow beam light source is turned off and a next narrow beam light source is turned on. In this way, by collecting the signal qualities related to all the possible segments, the narrow beam light source contributing to the best signal quality is selected for establishing data communication with the remote device. Note that since L5 is always on, the feedback signals received from the remote device is based on a received signal mixed with the test signals from the wide beam light source L5 and an individual narrow beam light source L1-L4. Preferably, when the wide beam light source L5 is initially turned on, a first feedback signal is also provided by the remote device, which is dedicated to the contribution of L5. And then, during the beam selection procedure, if further feedback signals related to a combined contribution of an individual narrow beam light source and the wide beam light source do not indicate a significantly improved signal quality as compared to the one indicated in the first feedback signal, it may also be an option to select the wide beam light source for data communication.

Figure 8:
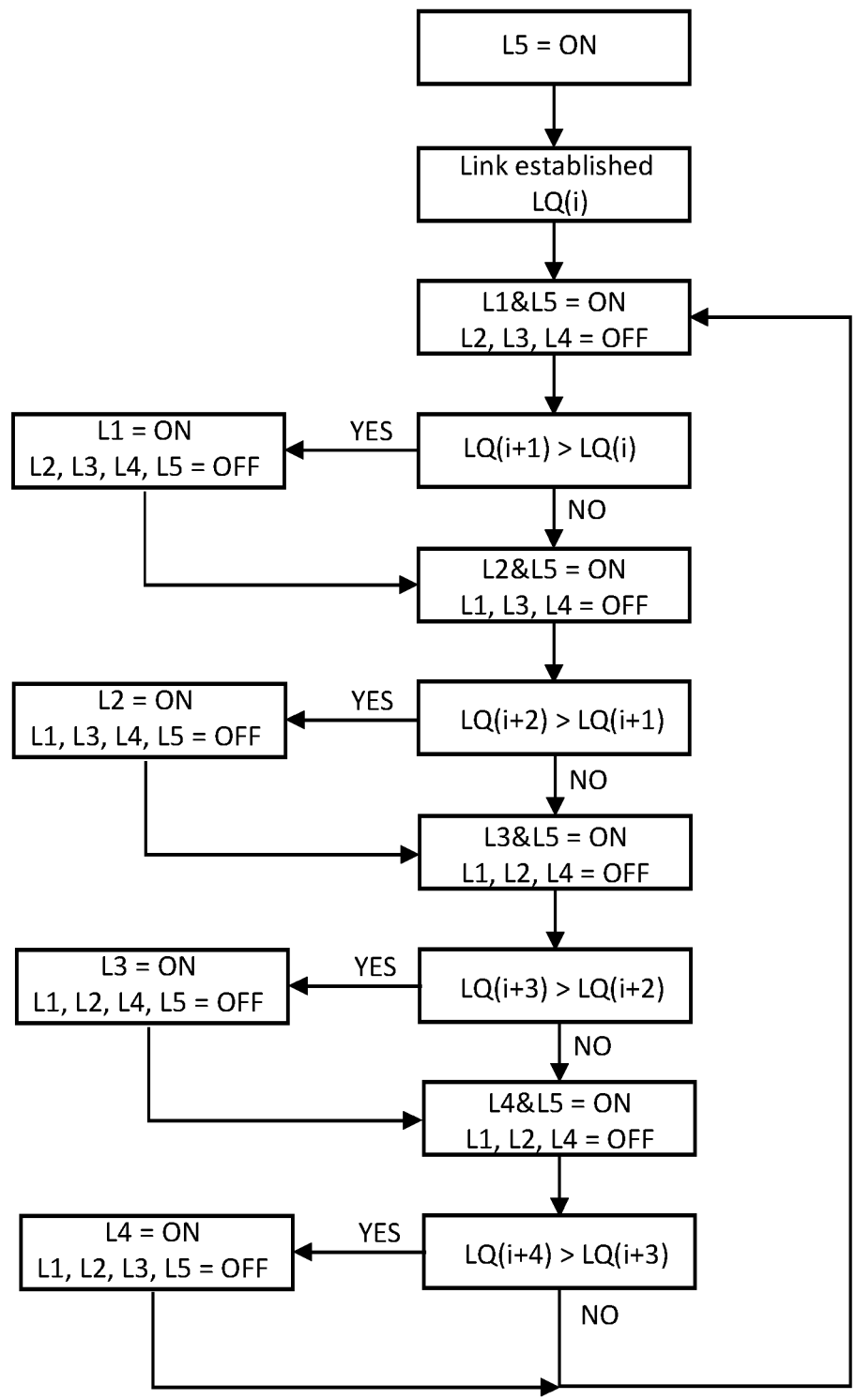
FIG. 8 shows a flow chart of an exemplary beam selection procedure.

FIG. 8 shows a flow chart of another exemplary beam selection procedure. In this option, the wide beam light source is also used to establish a low speed signaling link at the start. And then by checking a link quality of a combined contribution of the wide beam light source and an individual narrow beam light source, a further step may be carried out selectively. When the combined link quality is better than a previously obtained link quality parameter, the wide beam light source is turned off with only the narrow beam light source on. And then the link quality resulted from each individual narrow beam light source is tested more accurately.

As shown in the flow chart, initially L5 is turned ON to establish a low speed signaling link, and the link quality as indicated in the feedback signal regarding L5 is recorded as LQ(i). In the next step, an individual narrow beam light source is also turned on. As an example, narrow beam light source L1 is turned on and L2-L4 remain off state. Note that another order of the turning on the narrow beam light sources may also be possible, such that by taking a preference of using different narrow beam light sources into account. The link quality related to a combined contribution of L1 and L5 is recorded as LQ(i+1). When LQ(i+1) is better than LQ(i), in the additional step, L5 is also turned off. And then with only L1 is on, a link quality related to the link between L1 and the remote device is recorded. The search continues to the next narrow beam light source L2. With L2 and L5 on (L1, L3, L4 off), the link quality related to a combined contribution of L2 and L5 is recorded as LQ(i+2). When LQ(i+2) is better than LQ(i+1), it indicates that L2 may be a better option as compared to L1, and the additional step to check the individual contribution of L2 is also carried out. In this way, the beam selection procedure loops through the combination of an individual narrow beam light source and the wide beam light source and carries out additional steps selectively to identify the performance of a certain narrow beam light source individually. Therefore, a more accurate decision can be made.

With the two options of the beam selection procedure as described in FIG. 7 and FIG. 8 respectively, a single light source is selected for data communication, and the rest of the light sources are turned off. Since at most two light sources are turned ON at the same time during the beam selection procedure and the duration for sending test signals may take only a few milliseconds (ms), the power consumption used for the beam selection procedure will not be a burden to the system. Furthermore, by selecting a better aligned narrow beam light source, a higher data rate can be supported, and the data transmission will be much more efficient.

Figure 9:
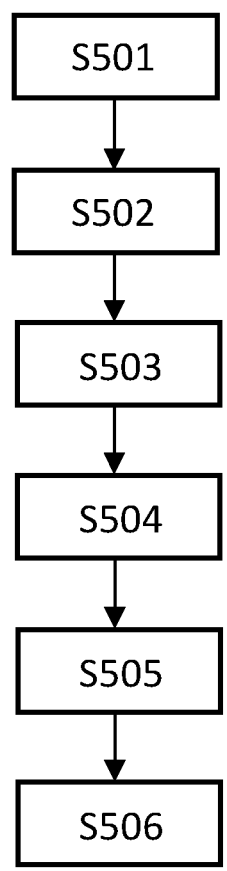
FIG. 9 shows a flow chart of a method of the apparatus.

FIG. 9 shows a flow chart of a method 500 an apparatus 100 for use in an OWC system. The method 500 comprises the apparatus 100: in step S501 turning, by a plurality of switches S1-S5, on or off a corresponding one out of a wide beam light source L5 and two or more narrow beam light sources L1-L4 individually: in step S502, emitting by each of the two or more narrow beam light sources L1-L4 in a different direction, wherein a combined field-of-view, FoV, of the narrow beam light sources L1-L4 is covered by a FoV of the wide beam light source L5: in step S503, receiving one or more feedback signals from a remote device 200; controlling, in step S504, the plurality of switches S1-S5 via a control signal: in step S505, updating the control signal based on the one or more feedback signals received by the receiver; in step S506, carrying out a beam selection procedure by sending test signals via the wide beam light source L5 and one or more narrow beam light sources L1-L4 to the remote device 200 for selecting one out of the narrow beam light sources L1-L4 to establish data communication with the remote device 200.

The methods according to the invention may be implemented on a computer as a computer implemented method, or in dedicated hardware, or in a combination of both.

Executable code for a method according to the invention may be stored on computer/machine readable storage means. Examples of computer/machine readable storage means include non-volatile memory devices, optical storage medium/devices, solid-state media, integrated circuits, servers, etc. Preferably, the computer program product comprises non-transitory program code means stored on a computer readable medium for performing a method according to the invention when said program product is executed on a computer.

Methods, systems, and computer-readable media (transitory and non-transitory) may also be provided to implement selected aspects of the above-described embodiments.

The invention claimed is:

1. An apparatus for use in an optical wireless communication, OWC, system, the apparatus comprising:
 a wide beam light source;

two or more narrow beam light sources each configured to emit in a different direction, wherein a combined field-of-view, FoV, of the narrow beam light sources is covered by a FoV of the wide beam light source;

a plurality of switches each configured to turn on or off a corresponding one out of the wide beam light source and the two or more narrow beam light sources individually;

a receiver configured to receive one or more feedback signals from a remote device; and a controller configured to:
control the plurality of switches via a control signal;
update the control signal based on the one or more feedback signals received by the receiver;
carry out a beam selection procedure by sending test signals via the wide beam light source and one or more narrow beam light sources to the remote device to enable a selection of one out of the narrow beam light sources for establishing data communication with the remote device, wherein during the beam selection procedure the controller is configured to set the control signal to:
turn on the wide beam light source; and simultaneously, turn on at most one of the narrow beam light sources;

and wherein the wide beam light source and the receiver are configured to maintain a low speed bi-directional signaling link with the remote device to assist the beam selection procedure.

2. The apparatus according to claim 1, wherein the receiver is an OWC receiver, and the OWC receiver is further configured to receive data packets from the remote device for data communication.

3. The apparatus according to claim 1, where the receiver is a radio receiver, and the one or more feedback signals are received by the radio receiver via a radio frequency channel.

4. The apparatus according to claim 1, wherein each narrow beam light source supports a larger signal bandwidth than the wide beam light source.

5. The apparatus according to claim 1, wherein the one or more feedback signals are related to a signal quality of a test signal received by the remote device, and the signal quality is related to at least one of: a received signal strength, a signal to noise ratio, a power state density, and a bit error rate.

6. The apparatus according to claim 5, wherein the controller is configured to set the control signal to turn on each one out of the narrow beam light sources sequentially during the beam selection procedure.

7. The apparatus according to claim 6, wherein the controller is configured to select one narrow beam light source based on a comparison of signal qualities comprised in feedback signals received sequentially corresponding to a time period that an individual narrow beam light source is on.

8. The apparatus according to claim 5, wherein the controller is configured to select one narrow beam light source when a signal quality comprised in a feedback signal is larger than a predefined threshold, and the feedback signal is received in a time period that the corresponding narrow beam light source is on.

9. The apparatus (100) according to claim 1, wherein the controller is configured to control the plurality of switches to turn on only a selected narrow beam light source for data communication and turn off all the other light sources after the beam selection procedure.

10. The apparatus according to claim 1, wherein each one of the wide beam light source and the two or more narrow beam light sources comprises at least one of: a LED, a laser, and a vertical-cavity surface-emitting laser (VCSEL).

11. An optical wireless communication, OWC, system comprising:
an apparatus according to claim 2; and
a remote OWC transceiver comprising:
at least one light sensor configured to receive at least one of the test signals sent by the apparatus;
at least one light source configured to send one or more feedback signals to the apparatus upon receipt of at least one of the test signals from the apparatus by the at least one light sensor.

12. An optical wireless communication, OWC, system comprising:
an apparatus according to claim 3; and
a remote OWC receiver comprising:
at least one light sensor configured to receive at least one of the test signals sent by the apparatus;
at least one radio transmitter configured to send one or more feedback signals via a radio frequency channel to the apparatus upon receipt of at least one of the test signals from the apparatus by the at least one light sensor.

13. A method of an apparatus for use in an optical wireless communication, OWC, system, the method comprising the apparatus:
turning, by a plurality of switches, on or off a corresponding one out of a wide beam light source and two or more narrow beam light sources individually;
emitting by each of the two or more narrow beam light sources in a different direction, wherein a combined field-of-view, FoV, of the narrow beam light sources is covered by a FoV of the wide beam light source;
receiving one or more feedback signals from a remote device;
controlling the plurality of switches via a control signal;
updating the control signal based on the one or more feedback signals received by the receiver;
carrying out a beam selection procedure by sending test signals via the wide beam light source and one or more narrow beam light sources to the remote device for selecting one out of the narrow beam light sources to establish data communication with the remote device;
turning on the wide beam light source and at most one of the narrow beam light sources simultaneously during the beam selection procedure; and wherein the wide beam light source and the receiver are configured to maintain a low speed bi-directional signaling link with the remote device to assist the beam selection procedure.

14. A non-transitory computer readable medium comprising instructions which, when the instructions are executed by an apparatus comprising a processor, cause the processor to perform the method of claim 13.

* * * * *